United States Patent
Conzola et al.

(10) Patent No.: US 6,497,367 B2
(45) Date of Patent: Dec. 24, 2002

(54) PROVIDING A LOCATION AND ITEM IDENTIFICATION DATA TO VISUALLY IMPAIRED SHOPPERS IN A SITE HAVING BARCODE LABELS

(75) Inventors: Vincent Charles Conzola, Raleigh, NC (US); Aaron Roger Cox, Raleigh, NC (US); Kerry A Ortega, Raleigh, NC (US); Thomas John Sluchak, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 09/842,954

(22) Filed: Apr. 26, 2001

(65) Prior Publication Data

US 2002/0158133 A1 Oct. 31, 2002

(51) Int. Cl.$^7$ .................................................. G06K 7/10
(52) U.S. Cl. ............................ 235/462.45; 235/462.01; 235/472.01
(58) Field of Search ..................... 235/462.45, 462.01, 235/462.08, 462.17, 462.31, 472.01

(56) References Cited

U.S. PATENT DOCUMENTS

| | | | |
|---|---|---|---|
| 3,983,389 A | 9/1976 | Cowardin et al. | 250/227 |
| 4,654,482 A | 3/1987 | DeAngelis | 379/95 |
| 4,766,298 A | 8/1988 | Meyers | 235/462 |
| 4,940,116 A | 7/1990 | O'Conner et al. | 186/61 |
| 5,144,294 A | 9/1992 | Alonzi et al. | 340/825.49 |
| 5,177,800 A | 1/1993 | Coats | 381/51 |
| 5,319,185 A | 6/1994 | Obata | 235/472 |
| 5,340,972 A | 8/1994 | Sandor | 235/472 |
| 5,410,140 A | 4/1995 | Bard et al. | 235/462 |
| 5,508,699 A | 4/1996 | Silverman | 340/944 |
| 5,640,193 A | 6/1997 | Wellner | 348/7 |
| 5,666,658 A | 9/1997 | Borchardt et al. | 455/42 |
| 5,806,017 A | 9/1998 | Hancock | 701/209 |
| 5,917,174 A | 6/1999 | Moore et al. | 235/462.44 |
| 5,918,214 A | 6/1999 | Perkowski | 705/27 |
| 5,950,173 A | 9/1999 | Perkowski | 705/26 |
| 5,975,416 A | 11/1999 | Chow et al. | 235/383 |
| 5,979,757 A | 11/1999 | Tracy et al. | 235/383 |
| 5,995,015 A | 11/1999 | DeTemple et al. | 340/825.49 |
| 5,999,913 A | 12/1999 | Goodwin, III | 705/20 |
| 6,097,305 A | 8/2000 | Im et al. | 340/825.19 |
| 6,173,891 B1 | 1/2001 | Powell | 235/383 |

FOREIGN PATENT DOCUMENTS

| | | | | |
|---|---|---|---|---|
| FR | 2624005 | * | 12/1987 | A61F/9/08 |
| FR | 2628968 | * | 3/1988 | A61F/9/08 |

* cited by examiner

Primary Examiner—Thien M. Le
Assistant Examiner—Daniel St. Cyr
(74) Attorney, Agent, or Firm—J. Bruce Schelkopf; Ronald V. Davidge

(57) ABSTRACT

A portable unit assists a visually impaired user within a store by providing an output, using speech synthesis, of his location based on reading various barcode labels. The location of each barcode label is determined from data stored within the portable unit. The portable unit also determines a path between the user's location and an item he selects to find, describing the path using speech synthesis. The user can select, by speech or by depressing a button, items for a target list. Preferably, some barcode labels identify an end of an aisle, which cause the portable unit to describe, using speech synthesis, items on the aisle and items in the target list on the aisle.

29 Claims, 6 Drawing Sheets

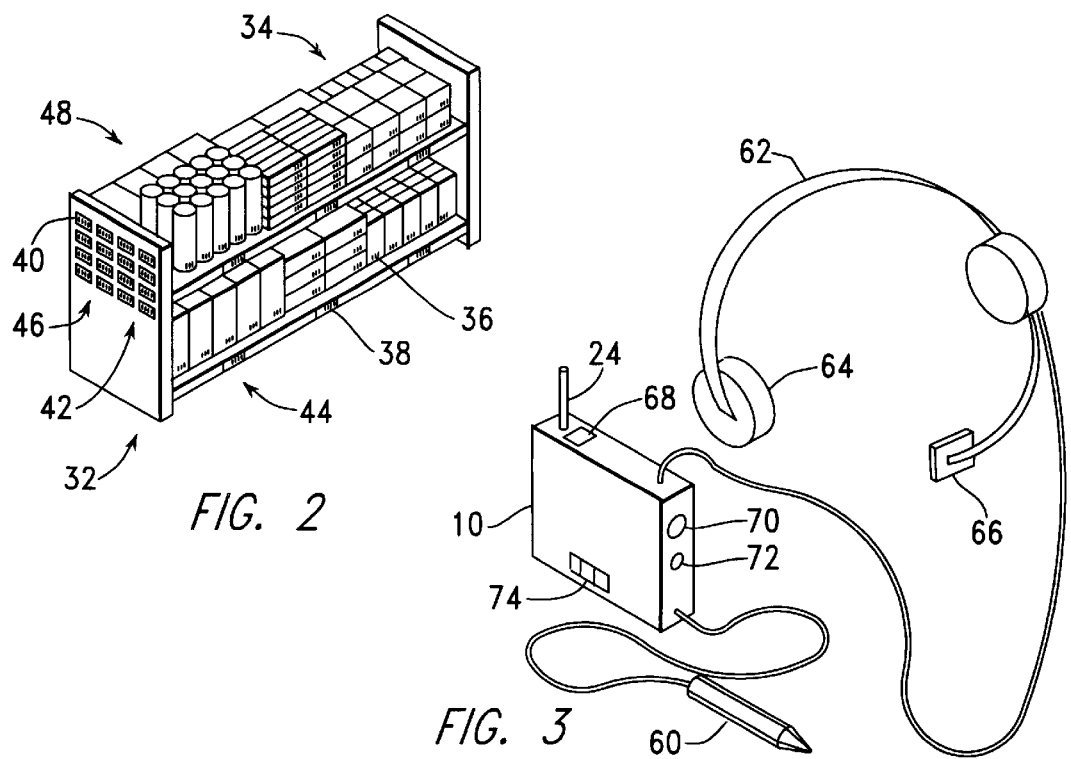
FIG. 2
FIG. 3
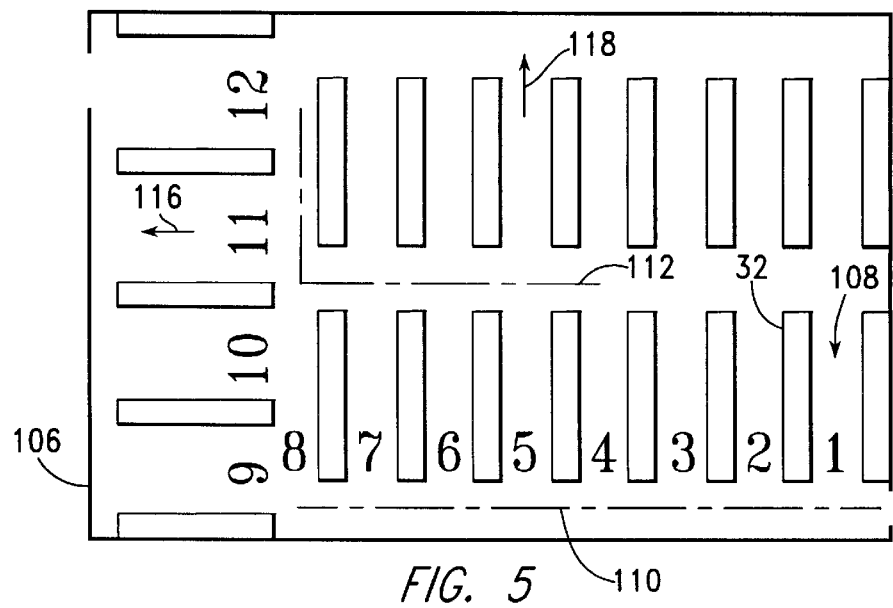
FIG. 5

PROVIDING A LOCATION AND ITEM IDENTIFICATION DATA TO VISUALLY IMPAIRED SHOPPERS IN A SITE HAVING BARCODE LABELS

BACKGROUND OF THE INVENTION

1. Field of the Invention

This invention relates to a device and method for assisting a visually impaired person to determine his location within a site, such as a store, and, more particularly, to a device and method for locating his position and for locating various products offered for sale by reading and interpreting barcode information.

2. Background Art

Large retail stores, such as supermarkets and discount stores of various types often place signs above the various aisles listing the types of products that are displayed on the particular aisles. While signs of this kind are often very helpful to people having normal vision, such signs are often of little or no advantage of people having impaired vision. What is needed is a convenient system providing similar advantages for people with impaired vision.

Universal Product Code (UPC) bar code labels are pervasive in the retail marketplace. Such labels are generally printed on product containers in a conspicuous manner to provide a simple interface between the product and a computer terminal. While bar codes are used for many purposes, the most pervasive purpose is to provide a rapid manner of identifying a particular product being purchased at the cash register. The bar code is decoded, using a bar-code scanner near the cash register, into a single multi-digit UPC number, unique to the type of product. However, additional information is needed to make a meaningful determination of the type of product. This information is typically stored in the retail establishment in the form of a database, which is accessed by a computer system communicating with the cash register terminal and with the bar-code scanner. For each UPC number corresponding to a product in the inventory of the store, the database provides detailed information describing the manufacturer, the size of the product, etc. This kind of information is the same, since it identifies the product itself, regardless of the store or organization selling the product. Typically, the database also includes information, accessed using the same UPC number, which, while being determined for the particular type of product, is unique for the store or organization selling the product. Such information defines, for example, the price for which the product is to be sold.

A number of U.S. Patents describe portable devices for reading bar codes, including the UPC barcodes. For example, U.S. Pat. No. 3,983,389, the disclosure of which is incorporated herein by reference, describes a wand for reading such codes, including a light emitting diode, a silicon photodetector, and a fiber optic structure. U.S. Pat. No. 5,319,185, the disclosure of which is also incorporated herein by reference, describes a bar code reader having a sensor unit to be mounted on the user's finger and a decoder unit to be mounted on his wrist, with the sensor and decoder units being connected by an electrical cable. U.S. Pat. No. 5,340,972, the disclosure of which is incorporated herein by reference, describes a bar code scanner unit mounted on the back of the hand or wrist of a user, freeing the hands and arms of the user to perform normal manual tasks. U.S. Pat. No. 5,410,140, the disclosure of which is incorporated herein by reference, describes a miniature optical scanner mounted on a finger-sized ring, allowing the user to wear the scanner on a finger, with a separate unit housing other components of the scanning system.

U.S. Pat. No. 5,177,800, the disclosure of which is hereby incorporated by reference, describes a bar code reading speech synthesis device, which includes means for reading a bar code and accessing internal or external memory to supply speech data to a speech synthesizer based on the bar code numerical value.

U.S. Pat. No. 5,995,015, the disclosure of which is hereby incorporated by reference, describes a system, including infrared transmission capabilities, for communicating between a store computer and locations in the aisles of a retail facility. A hard-wired grid connects the store computer to a plurality of transceivers located in zones throughout the facility and the transceivers establish a wireless link to the locations.

The use of a bar code reading wand attached to a small processor and a voice chip, allowing a person to "read" UPC bar codes, determining the type and size of a product, is described in the *IBM Technical Disclosure Bulletin*, Vol. 30, No. 4, September 1987, p. 151. The device would ideally have a small speaker, a headphone jack, and a connector through which information could be fed into the memory of the device. The information, which could be downloaded from a personal computer, could be new product information, price when available, etc.

U.S. Pat. No. 5,917,174 describes a device and method for assisting visually-impaired persons to obtain verbal information from consumer product bar codes. The device includes a scanner unit, a processing unit, a power unit, and a voice synthesizer. The method involves the person scanning the bar code of the product with the scanner unit to provide a first signal which is communicated to the processing unit for locating, retrieving, and outputting product information corresponding to the bar code in a form for the voice synthesizer to generate a verbal output to convey the information to the person.

While the devices of the *IBM Technical Disclosure Bulletin*, Vol. 30, No. 4, September 1987, p. 151, and of U.S. Pat. No. 5,917,174 provide a visually impaired person with a level of information regarding products available for purchase which cannot be normally obtained without the assistance of another person, what is needed is a system additionally providing information relative to the movement of the user within a retail environment, with assistance in determining how to reach the location of various specific products for sale in the environment.

The prior art describes a number of navigation systems using radio frequency (RF) transponders placed at various locations within an environment to be traversed and a hand-held RF transmitter or transceiver. For example, a navigation system for the visually impaired, consisting of a handheld device which may be in the form of a cane containing a radio frequency (RF) identification reader or base station, is described in the *IBM Technical Disclosure Bulletin*, Vol. 38, No. 10, October 1995, p. 103. Provision is made for audio feedback from the reader to the person using the system. RF identification transponders or tags are placed at key locations to mark a route to be followed. The tags may be coded in such a way to indicate their coordinates. For example, tags may be placed at intervals along a corridor, with a coded message being related to the user indicating the distance traversed along the corridor. The tags may also be placed on objects, such as furniture or appliances, to aid in their location or avoidance.

U.S. Pat. No. 5,142,294, the disclosure of which is hereby incorporated by reference, describes an RF message apparatus for aiding ambulatory travel by handicapped users, such as blind individuals. The apparatus generally comprises a portable RF transceiver carried by the user and a stationary base RF transceiver unit. The portable RF transmitter transmits a message request signal in response to manual activation of a transmit button by the user. When this signal is received by the base unit, the base unit transmits an audio message through a modulated RF signal to the portable transceiver. A tape cassette within the base unit is used to generate the audio message. The audio message provides location information, such as the streets of an intersection at which the base unit is located.

U.S. Pat. No. 6,097,305 describes a dialogic style RF guidance system comprising multiple stationary base-sets established at the destination and a hand-held apparatus carried by a visually handicapped person, who reaches his destination by communicating with the base-set and by receiving messages from the base-set through microphones or external speakers. The base set produces guidance information in response to a requesting signal made from the hand-held apparatus. The apparatus is preferably located in buildings, bus stops, railway stations, and crossings.

U.S. Pat. No. 5,806,017 describes an autorouting navigation system for directing one or more visually impaired persons to a physical location. A portable navigation unit includes an input device for selecting a target location corresponding to a physical location of a plurality off location beacons, a receiver configured to receive signals from the location beacons, a memory storing information correlating the locations of the location beacons, and an output device for communicating with the user.

While such systems, using RF transponders assist a visually impaired person in navigating a space equipped with the necessary transponders, what is needed is a system making such assistance widely available by not requiring the use of such transponders. Also, what is needed is a system providing for the identification of various products available in stores. Furthermore, in comparison to the system of U.S. Pat. No. 6,097,305, what is needed is a system for use in crowded interior areas, such as retail stores, in which audio feedback is provided through individual, hand-held devices which may be equipped with earphones, instead of through loudspeakers within stationary base units.

U.S. Pat. No. 5,508,699 describes a locator device for the visually impaired including a transmitter and a dual sensing system having a receiver with earphones which are attached to opposite sides of a unit worn on the user's head. The transmitter can be attached to a variety of objects to be found, such as a bathroom door, traffic signal, or radio. The sensing system is capable of determining a direction and distance of the signal, and capable of producing first and second audible notifiers in each of the earphones. The notifier produced in each earphone is different and is associated with the direction and distance of the transmitted signal. When the notifier produced in each earphone is the same, the user is directly in front of the object to be located. While this system facilitates the location of a single object to which the transmitter is attached, what is needed is a system having a capability of finding a large number of different objects, such as items within a store that the user decides to purchase.

U.S. Pat. No. 5,666,658, the disclosure of which is incorporated herein by reference, describes systems, methods, and apparatus provided for conducting local wireless audio signal transmissions from a local audio signal source to a person within a local signal transmission area, with the transmissions being conducted, for example, over the 900 MHz local transmission band to a portable receiver unit. This patent is illustrative of apparatus for transmitting information for a relatively short distance within a building.

U.S. Pat. No. 5,979,757 describes a portable shopping system provided with an improved data presentation system for presenting a customer with desired data on a portable terminal. The portable terminal includes audio as well as video presentation means which are used to provide customer-specific marketing files to promote the sale of identified items and a scanner for reading bar codes. In a preferred embodiment, a portable terminal having an integrated machine code (barcode) reader and a radio is provided with a graphical user interface such as a "web browser" and a display for illustrating help and instructional files associated with a selected item identified with the machine code reader. For example, a consumer using a hand-held terminal receives marketing, pricing, and additional information from a central host for products scanned with the terminal. What is needed is a means providing information helping a visually impaired individual to navigate the aisles of a site, such as a store and information helping such an individual find particular items within the site without having to find and scan them first.

SUMMARY OF THE INVENTION

It is a first objective of the invention to provide a visually impaired person with an ability to determine his location within a site, such as a retail store, by reading barcode labels within the site.

It is another objective of the invention to provide a visually impaired person with a way to determine an optimum path within a site from his present position to a location of a specified product.

It is yet another objective of the invention to provide a visually impaired person with an ability to form a target list of products to be purchased, and thereafter to indicate a proximity of products on the target list as he moves through a store.

According to a first aspect of the invention, a system for providing location information within a site allows a visually impaired person to determine his location within the site by causing the system to read a barcode label and to compare a coded value generated from the barcode pattern with values stored in the first data structure. When a stored value equal to the coded value is found, a corresponding set of location coordinates describes the location, which is described to the user by means of synthetic speech. The system includes a number of barcode labels placed at a number of locations within the site and a portable device. Each barcode label within the number of barcode labels includes a pattern of parallel markings representing a coded value. The portable device includes a barcode reader producing electrical signals in response to patterns of the parallel markings, an audio amplifier, an audio speaker driven by the audio amplifier, data storage, and a processor. The data storage includes a first data structure having a first field containing data representing a plurality of coded values and a second field containing data representing a plurality of sets of location coordinates. Each coded value in the number of coded values is represented by a pattern of parallel markings on a barcode label within the number of barcode labels. Each set of location coordinates within the number of sets of location coordinates represents a location of a label having a coded value in the first field associated in the first data structure with the set of location coordinates in the second field. The processor is programmed to generate a coded value represented by a pattern of parallel markings read by the barcode reader in response to the electrical signals produced by the barcode reader, to find a set of location coordinates within the second field of the first data structure corresponding to the coded value, to generate a pattern of synthetic speech describing a location represented by the set of location coordinates, and to cause the audio amplifier to drive the speaker in response to a generated pattern of synthetic speech.

Preferably, the system also provides a capability to find the location of an item within a number of items placed at a number of locations within the site, with the first data structure additionally having a third field containing a number of descriptions representing the items. Each description in the number of descriptions is associated with a set of location coordinates in the second field, with the set of location coordinates describing a location of an item described by the description. The processor is additionally programmed to accept an input describing an item in the number of items and to determine a location of the item by finding a set of location coordinates associated with a description of the item in the first data structure.

Preferably, the system also has a capability to determine a path between the user's position, determined from the most recently read barcode label, and the location of a particular item he has chosen to find. Therefore, the processor is additionally programmed to determine a path between a location represented by the set of location coordinates corresponding to the coded value in the data structure and the location of the item, and to generate a pattern of synthetic speech describing the coordinates.

Preferably, the system can also provide the user with a list of items near the user's location, with the processor being additionally programmed to form a list of descriptions of items at a location represented by the set of location coordinates corresponding to the coded value in the data structure, and to generate a pattern of synthetic speech describing the list of descriptions of the items.

BRIEF DESCRIPTION OF THE DRAWINGS

FIG. 2 is a perspective view of shelving, including barcode labels, in a retail environment of FIG. 1;

FIG. 3 is a perspective view of the portable unit of FIG. 1;

FIG. 5 is a pictographic view of a retail establishment in the system of FIG. 1, showing considerations made in determination of a path through the establishment; FIG. 6 is divided into a left portion, indicated as FIG. 6A, a central portion, indicated as FIG. 6B, and a right portion, indicated as FIG. 6C.

DETAILED DESCRIPTION OF THE INVENTION

Figure 1:
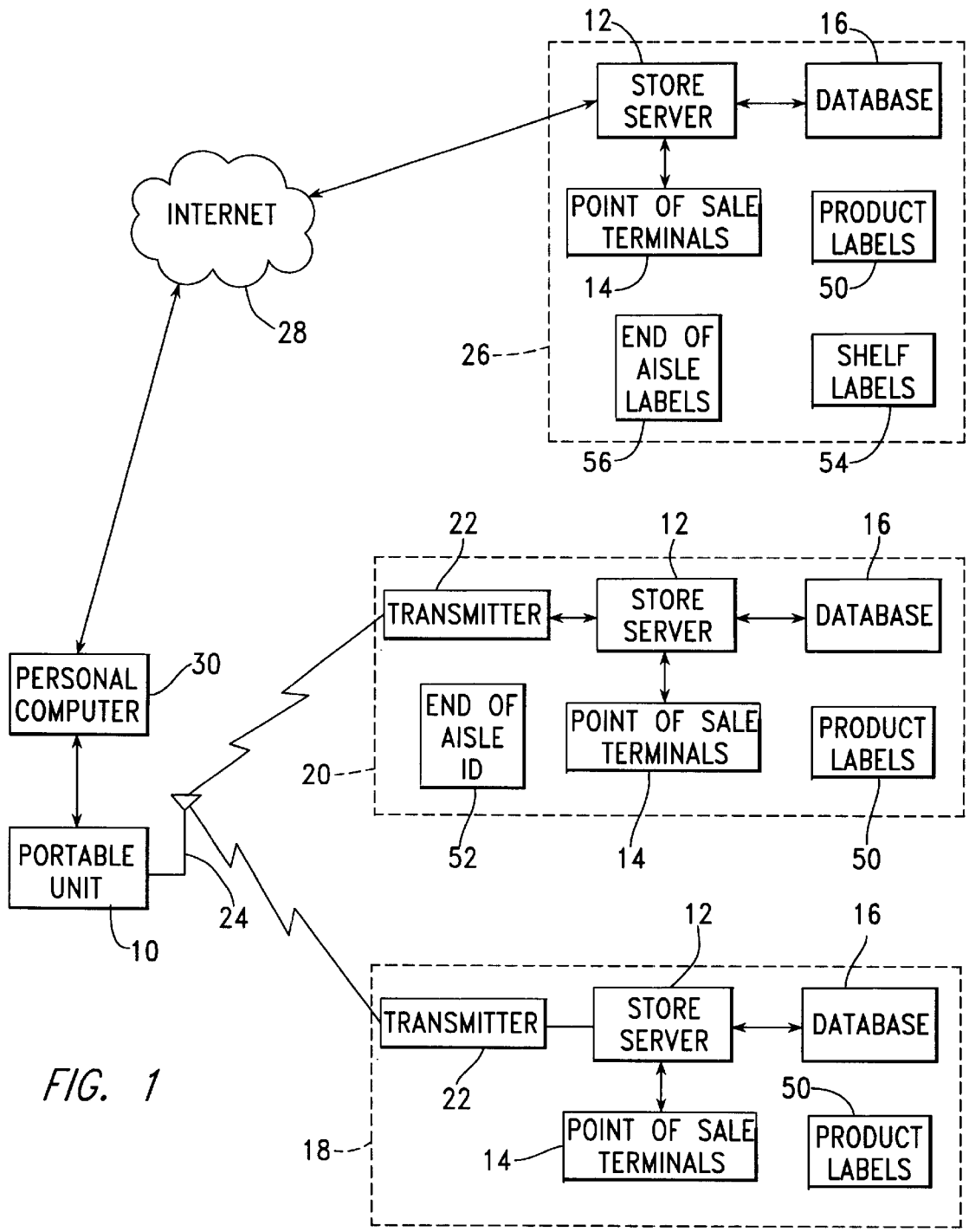
FIG. 1 is a block diagram of a system, including a number of retail environments and a portable unit, configured in accordance with the present invention.

FIG. 1 is a block diagram of a system configured in accordance with the present invention. The system includes a hand-held, portable unit 10, which is carried by the user, and a number of sites, such as retail store configurations, each of which forms an environment in which the portable unit 10 is used to navigate aisles, to locate particular, desired products, and to determine the characteristics of products which have been located or happened upon. While it is conceivable that a visually impaired user may shop at only one type of store configuration, or even at only one store, it is desirable to provide the portable unit 10 with an ability to operate in a number of different kinds of environments.

Each of the retail store configurations of FIG. 1 includes a store server 12 having access to information relating to products being offered for sale. Such information is used, for example, in connection with one or more point of sale terminals 14 connected to communicate with the store server 12. The point of sale terminals 14 are conventional subsystems including scanners for reading the UPC barcodes on products being purchased. The store server 12 accesses a database 16, which may be external or internal to the server 12, storing information related to the products being offered for sale in the store. Conventionally, this information describes the sale price of each item, along with the available quantity of each item. Thus, the store server 12 is conventionally used to determine the sale price for an item in response to scanning the UPC barcode of the item at one of the point of sale terminals 14. Also, as items are sold, the associated quantity data stored in the database 16 is conventionally updated, with the store server 12 thus being additionally used for inventory control.

In accordance with the present invention, a means for transmitting information from the store server 12 to the portable unit 10 is also provided. In the examples of the first store configuration 18 and the second store configuration 20 the store server 12 is connected to communicate with a transmitter 22, which transmits data to the portable unit 10 as the portable unit 10 is carried into or within the store configuration 18, 20. For example, the transmitter 22 may be a radio transmitter transmitting the information through modulation of a radio frequency carrier signal, with the signal being received by the portable unit 10 through an antenna 24. For example, the RF transmission capabilities generally described in U.S. Pat. Nos. 5,666,658 and 6,097,305 may be employed. Transmissions may be conducted over the 900 MHz local transmission band, as particularly described in U.S. Pat. No. 5,666,658. While this patent describes this apparatus as being used to transmit audio data, such apparatus is readily modified to transmit digital data. Alternately, the transmitter 22 may be an IR (infrared) transmitter of the general type described in U.S. Pat. No. 5,995,915, transmitting information through the modulation of an IR signal received by a transducer (not shown) within the portable unit 10.

In the example of the third store configuration 26, the store server 12 is connected through a telephone modem (not shown) to the Internet 28. A personal computer 30 is also connected to the Internet 28, and the portable unit 10 is connected to the personal computer 30 through a port allowing the transfer of data. Conventional means are used to provide an Internet web site, through which the store server 12 is accessed to gain access to information in the database 16 of the third store configuration 26. This information is downloaded, either to storage within the personal computer 30, or, through the personal computer 30, to storage within the portable unit 10. If the information is downloaded into storage within the personal computer 30, the information is subsequently transmitted from the personal computer 30 to storage within the portable unit 10.

The portable system 10 is primarily intended for use by a visually impaired person who can visually find features, such as labels and structures at the ends of aisles within the store, but who has difficulty reading product information printed on labels, etc.

FIG. 2 is a perspective view of a product display shelving unit 32 built in accordance with the present invention. The various products 34 being offered for sale each include a UPC barcode 36. The shelving unit 32 also includes a number of shelf barcode labels 38 and an array of aisle barcode labels 40 corresponding to products being offered for sale. The array of aisle barcode labels 40 is divided, for example, between a first array 42 of labels corresponding to products stored along a first side 44 of the shelving unit 32 and a second array 46 of labels corresponding to products stored along a second side 48 of the shelving unit 32. Alternately, the first array 42 of labels may correspond to products stored on an adjacent shelving unit (not shown) to face the first side 44 of the shelving unit 32, while the second array 44 of labels corresponds to products stored on the first side 44 of the shelving unit 32, so that the labels 40 correspond to products stored on either side of the aisle extending along the first side of the shelving unit 32.

In accordance with a preferred version of the invention, the barcode labels 40 at the end of the shelving unit 32 include an aisle-identifying label, which identifies the aisle on which it is placed by number so that the location can be compared with stored data providing the locations of products being offered for sale. Preferably, the barcode labels 40 at the end of the aisle also include a number of product-listing labels providing a list of products being offered for sale along the aisle. The shelf labels 38 preferably identify the products being offered for sale at a corresponding location on the shelf at which the labels are placed. Alternately or additionally, the shelf labels 38 identify a shelf location, for example, by indicating the distance in feet or meters from the end of the aisle. The product barcodes 36 are the standard UPC codes provided by a printing process during the manufacture of the various products 34. These codes identify the particular products, their manufacturers, sizes, etc., but do not give the prices, which have to be established by the store. Preferably, the barcode labels 36, 38, 40 also contain data allowing a device, such as the portable unit 10, reading the labels, to readily determine whether a label is an aisle-identifying label, a product-listing label, a shelf label, or a UPC code.

Continuing to refer to FIG. 2, and referring again to FIG. 1, various types of stores are expected to have various combinations of labels. For example, the first store configuration 18 includes only the UPC labels printed on products, collectively indicated as product labels 50. While a particular location within this store configuration 18 cannot be determined by using end of aisle labels 40 or shelf labels 38, the UPC labels 36 conventionally printed on the packaging of products 34 can be used to determine locations within the store configuration 18, provided that the locations of various products offered for sale are known from data stored within the store server 12 and transmitted to the portable unit 10. The second store configuration 20 includes the product labels 50 and end of aisle identifying labels, collectively indicated as 52, which aid in the process of determining a location within the store configuration 20 through the use of the data stored within the store server 12 and transmitted to the portable unit 10. The third store configuration 26 includes the product labels 50, shelf labels 38, collectively indicated as 54, and end of aisle labels 40, including both aisle identifying labels and product-listing labels, collectively indicated as 56. Thus, within the third store configuration 26, a location can be determined by reading an aisle-identifying label and by subsequently reading a shelf label to find a distance along the aisle.

FIG. 3 is a perspective view of the portable unit 10, together with an associated barcode-reading wand 60 and a headset 62. The wand 60, which is built, for example, according to the description of U.S. Pat. No. 3,983,389, is moved across a barcode to read the barcode. The headset 62 includes earphones 64, which are used to output data from the portable unit 10 to its user and a microphone 66, which is employed by the user to give voice commands to the portable unit 10. The portable unit 10 also includes means for receiving information downloaded from a store server 12 (shown in FIG. 1), including a port connector 68 for connection to the personal computer 30 (also shown in FIG. 1) and either an antenna 24 or an IR sensor 70. When an IR sensor 70 is provided, an IR source 72 may also be provided, for use in the initiation of an IR transmission from a store server 12. The port connector 68 may be, for example, a serial port connector, a parallel port connector, or a USB connector. The portable unit 10 additionally includes a number of buttons 74, which are depressed by the user to initiate various actions within the portable unit 10.

While a wand is shown in the example of FIG. 3 as providing a means for reading barcode labels, it is understood that a number of different types of optical reading devices well known to those skilled in the art may alternately be applied for this purpose.

Figure 4:
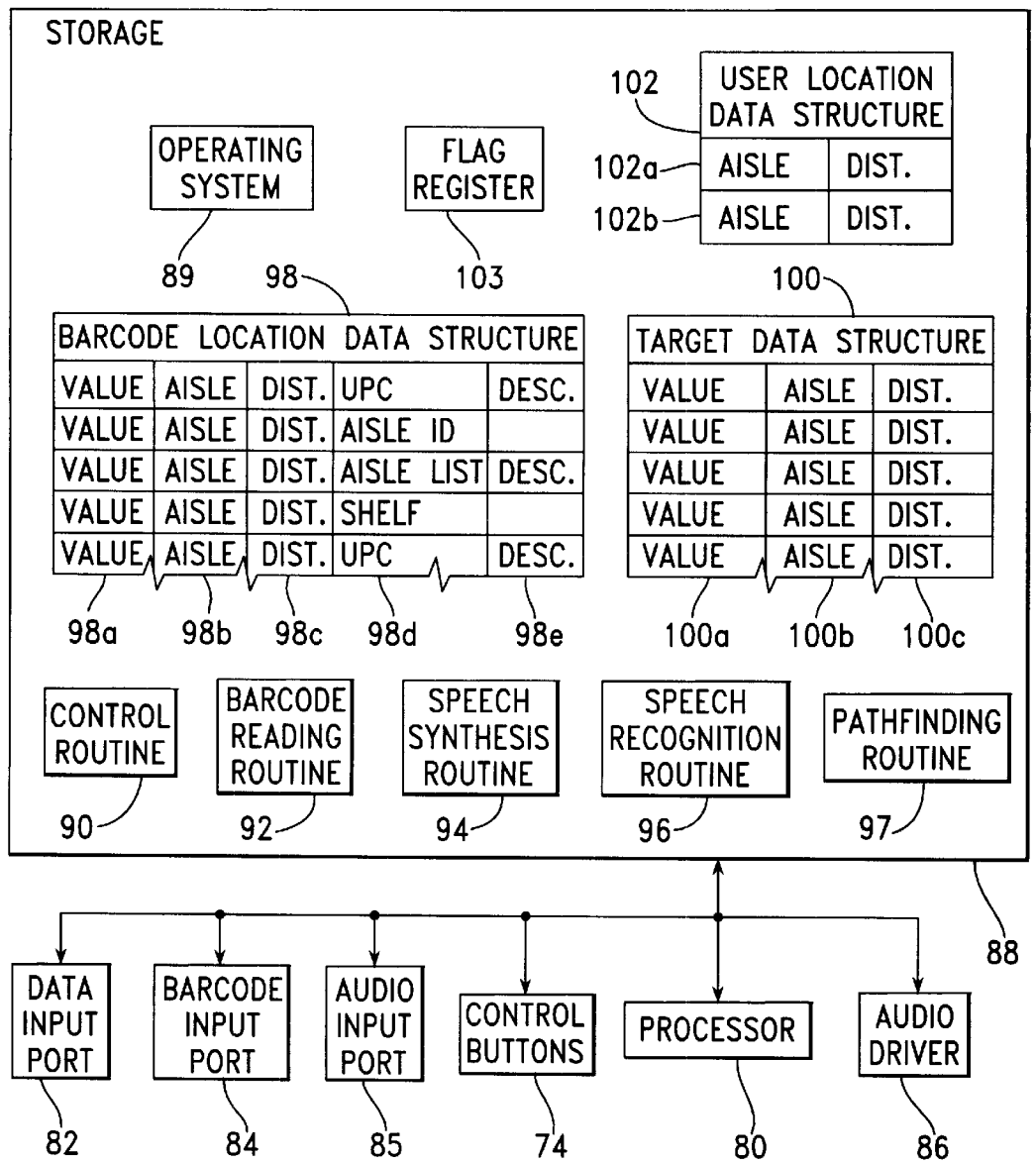
FIG. 4 is a block diagram of the portable unit of FIG. 1, particularly showing elements storing and processing data.

Referring to FIGS. 1, 3 and 4, FIG. 4 is a block diagram of the portable unit 10, particularly showing elements used in the storage and processing of information.

The portable unit 10 includes a processor 80, a data input port 82 associated with the port connector 68, a barcode input port 84 associated with the barcode reading wand 60, and an audio input port 85 receiving a signal from the microphone 66. The portable unit 10 also includes control buttons 74, an audio driver 86 generating an audio signal to drive the earphones 64, and storage 88, which may include both non-volatile storage, in which data storage is maintained when electrical power is shut off, and volatile storage.

The storage 88 includes both instructions for routines to execute within the processor 80 and data structures. The executable instructions and data structures may be stored in different portions of the storage 88. The routines stored within storage 88 include an operating system 89, a control routine 90 directing operation of the portable unit 10, a barcode reading routine 92 used with the wand 60 to read and interpret barcodes, a speech synthesis routine 94 used to generate audio data for providing an output through the audio driver 86 by means of text to speech processing, a speech recognition routine 96 used to recognize a limited number of spoken commands, and a pathfinding routine 97 for determining a path between the user's location and a product he wants to find.

The data structures stored within storage 88 include a barcode location data structure 98, comprising information downloaded from the store server 12, preferably having an entry describing the type and location of various each barcode within the store. The barcode location data structure 98 includes a first field 98a including a value returned by the barcode reading routine 92 when the particular barcode corresponding to the entry is read using the wand 60. The barcode location data structure 98 includes fields 98b and 98c, which store location coordinates of the particular barcode label of the entry. For example, field 98b includes a description of the aisle on which the barcode label is located, while field 98*c* includes a description of the distance along the aisle at which the barcode label is found. A field 98*d* describes the type of barcode label of the entry, with a UPC label 36 being a standard product label printed on a product container, a aisle ID label being a label identifying a particular aisle, an aisle list label being a label placed at an end of the aisle to indicate that a particular type of product is available on the aisle, and a shelf label 38 being a label placed on a shelf to establish a distance along the aisle. A field 98*e* is used to include a description of the each item represented by a UPC label entry. For example, such information describes the product type, brand, size, and price.

Storage 88 also includes a target data structure 100, listing products selected by the user to be located within the store, with each entry in a first field 100*a* of the target data structure 100 describing the value returned by the barcode reading routine 92 when the barcode of the selected product is read using the wand 60. Preferably, the target data structure includes a second field 100*b* including a description of the aisle on which the product selected by the user is located and a third field 100*c* including a description of the distance along the aisle at which the product is found. Other information on each product represented in the target data structure 100 may be found by looking up the value associated with the product in field 98*a* of the barcode location data structure 98.

Storage 88 also includes a user location data structure 102, having a first field 102*a* storing the location coordinates of the user. When a barcode label is read within the store, its location is used to update the location coordinates in the field 102*a*. The user location data structure 102 also includes a field 102*b* storing the location of a product that has been chosen to be located by an immediate effort, together with a description identifying that particular product, since more than one particular product type may be offered at a single location.

The storage 88 also includes a flag register 103, in which a flag is set to indicate that a search for a particular product is being carried out, so that location information found by reading barcodes may be used to further the search effort.

FIG. 5 is a pictographic plan view of a store 106, to which reference will be made in the description of location coordinates and the determination of a path to a chosen product. The store 106 includes a number of aisles 108, which are identified with individual numerals, separated by shelving units 32. As discussed above in reference to FIG. 3, preferably the store 106 includes both aisle identifying labels 40 and shelf labels 36, which together are used to determine the location of the user of unit 10. Each location within the store 106 is identified by two coordinates, according to an aisle number and a distance along the aisle from the beginning of the aisle. The distance along the aisle is measured in terms of a conventional distance measurement, such as feet or meters, in terms of steps, or according to the number of shelf labels 38 which are passed to arrive at the location.

Continuing to refer to FIG. 5, and referring additionally to FIG. 4, this coordinate structure is used both to store the location of various products in the barcode location data structure 98 to store the location of a product to be found immediately in the user location data structure 102, and to store the location of the user, also in the user location data structure 102. The contents of the user location data structure 102 are updated each time the user reads a barcode of any type with the system, provided the location of the barcode indicates that the user has moved.

The user can indicate to the unit 10 that he wants to find a particular product, either by means of a spoken command, which is processed by the speech recognition routine 96, or by responding to a speech. When output from the portable unit 10, which is generated by the speech synthesis routine 94 the user thus indicates that he wants to find a particular product, the pathfinding routine 97 compares the location of the product, stored in the user location data structure 102 after being taken from the barcode location data structure 98, with the location of the user, also stored in the user location data structure 102. The pathfinding routine 97 then determines a path, or preferably two or more paths, between the user's location and the location of the chosen product. The path may involve a primary route 110, which connects the front or beginning ends of the aisles, and a number of secondary routes 112. When more than one path is determined, the lengths of various paths are compared, with the shortest one being chosen. The chosen path is then communicated to the user through the speech synthesis routine 94, describing aisles to be taken, turns to be made, and distances to be traveled.

Many stores have groups of aisles running in different directions. In the example of FIG. 5, the store includes a first group of aisles extending in the direction of arrow 116 and a second group of aisles extending in the direction of arrow 118. The barcode location data structure 98 preferably includes rules to be used by the pathfinding routine 97 in determining paths. In the example of FIG. 5, such rules would describe the aisles nine through twelve as extending from aisle eight.

There are two basic strategies for finding items in a store of this kind. The first strategy is finding each individual item, one at a time, and the second strategy is involves going down each aisle to choose the desired items available on the aisle as they are passed. The first strategy is most effective when only a few items are to be found, while the second strategy is most effective when many items are to be found. This invention preferably supports both of these strategies, with a pathfinder routine developing an optimum path to the next specified item to support the first strategy, and with available items and chosen target items being stored for presentation according to the aisle on which they are placed to support the second strategy. Preferably, an item is chosen to be found immediately, according to the first strategy, or is selected to be part of a list of items to be found as the user passes through the store, according to the second strategy, either by means of a voice command identifying the item or by means of a selection process made as the portable system 10 recites the items which are available on a new aisle.

Figure 6:
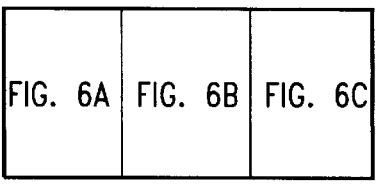
FIG. 6 is a flow chart of processes occurring during execution of a control routine in the portable unit of FIG. 1.
Figure 6A:
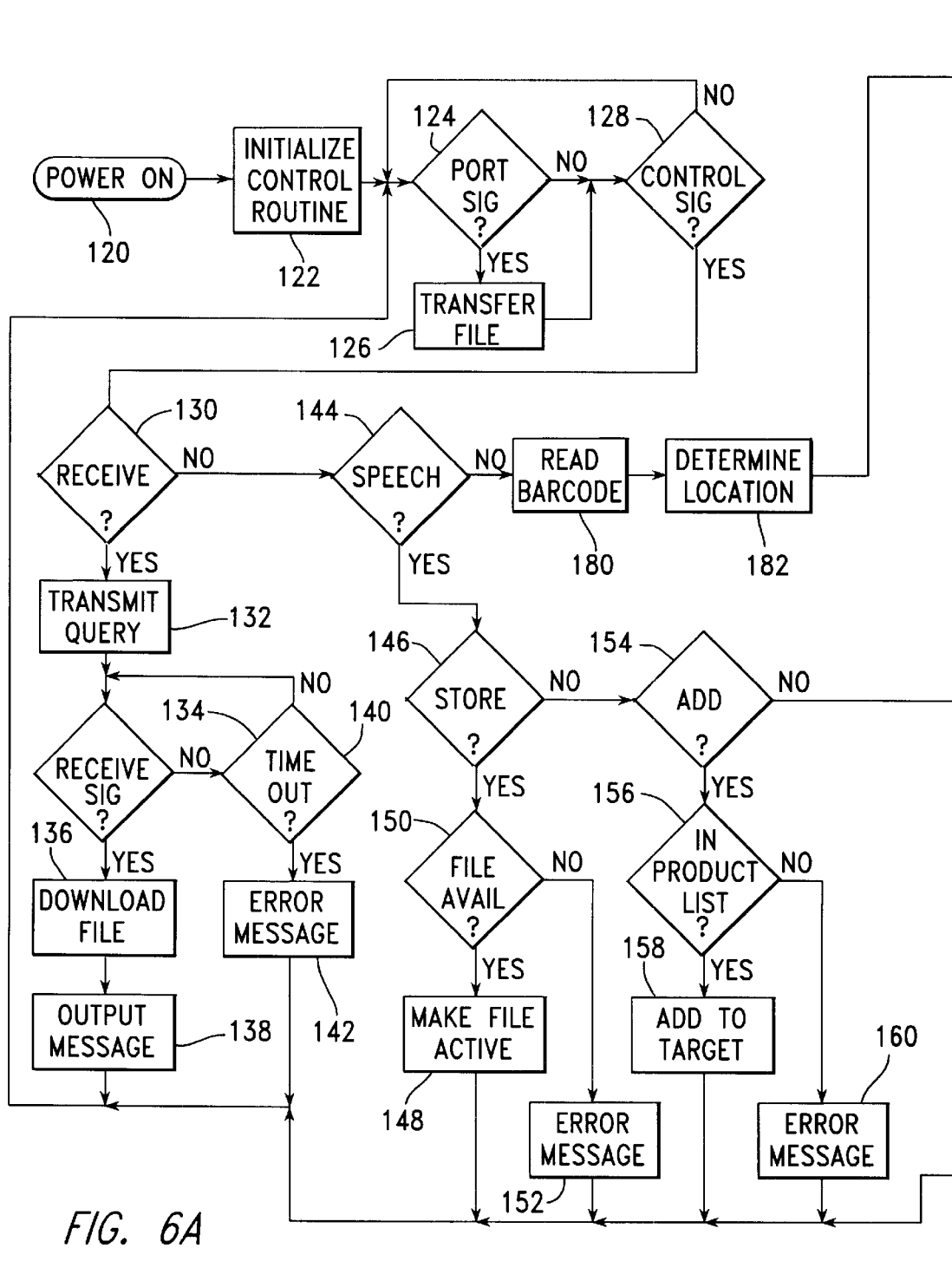
Figure 6B:
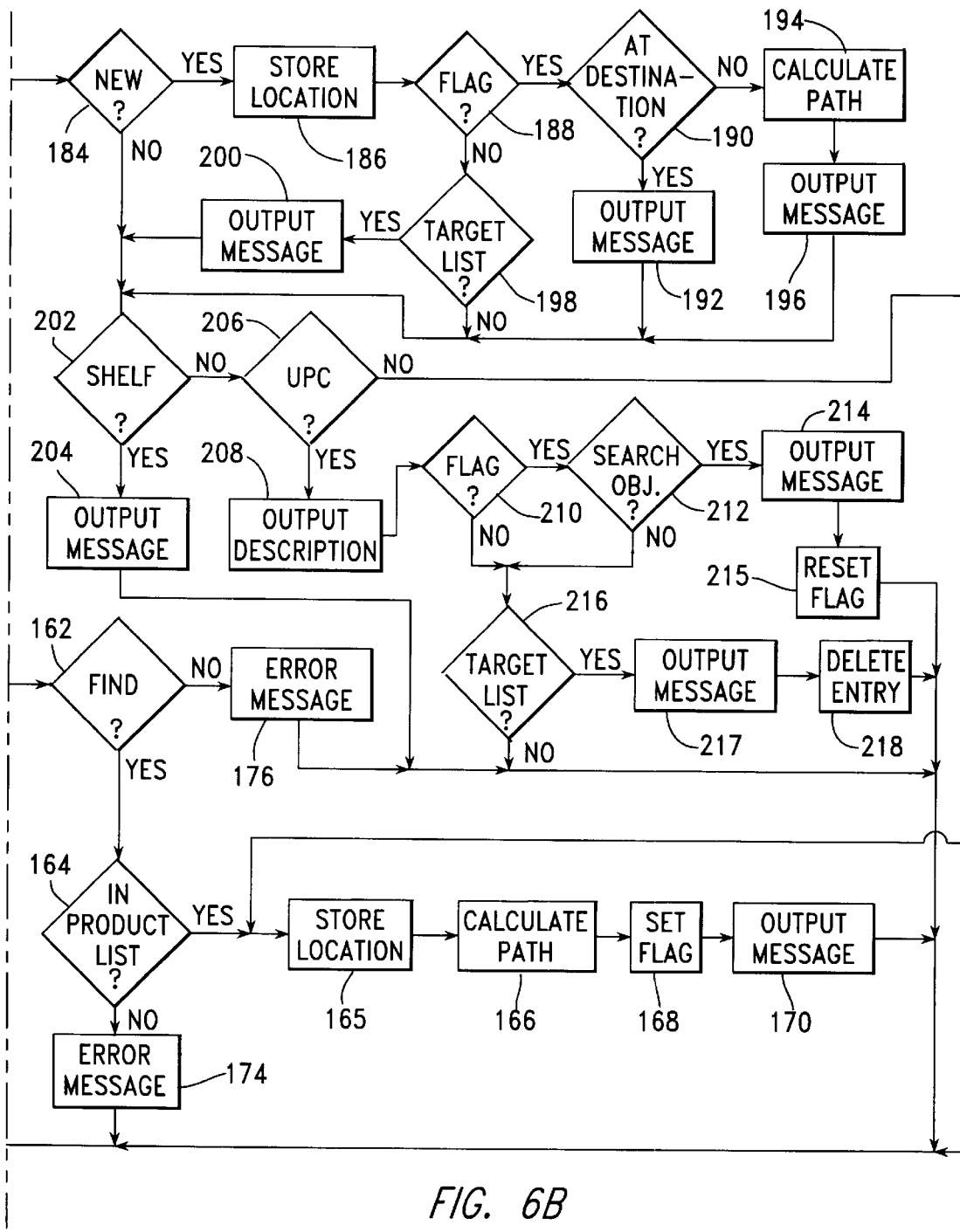
Figure 6C:
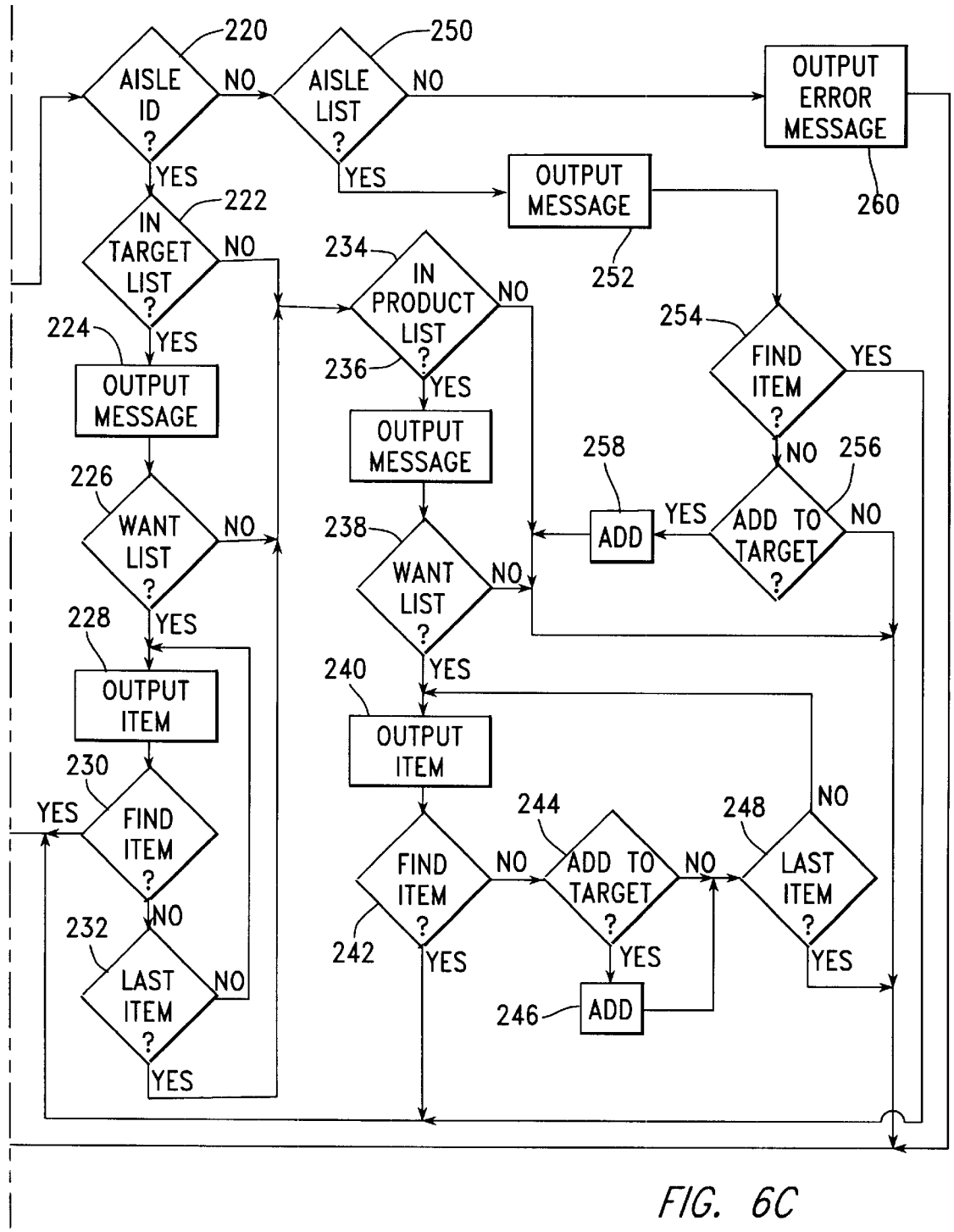

FIG. 6 is a flow chart of processes occurring during execution of a control routine in the portable unit 10 of FIG. 1. FIG. 6 is divided into a left portion, indicated as FIG. 6A, a central portion, indicated as FIG. 6B, and a right portion, indicated as FIG. 6C.

Referring to FIGS. 4 and 6, the portable unit 10 is started by turning the power on in step 120. Then, in step 122, the control routine 90, stored in storage 88, is initialized. This process of initialization may include, for example, conventional process steps of loading an operating system 89 from non-volatile storage to volatile storage, from which instructions are executed, together with loading various settings. After the process of initialization, the system waits for either a signal from the data input port 82, indicating that an attempt is being made to transfer a file, or for a control signal indicating that one of the control buttons 74 has been depressed.

The process of transferring a file between a personal computer 30 (shown in FIG. 1) and the portable unit 10 is initiated with the personal computer 30 connected to the portable unit 10 by a cable (not shown) plugged into the data port 68 of the portable unit 10 by the personal computer 30, which transmits a signal recognized by the portable unit 10 in step 124. Alternately, wireless means, such as an IR link or an RF link, may be established between the portable unit 10 and the personal computer 30 to transfer data. Then, the file is transferred. This process is used in step 126, for example, to transfer, to the portable unit 10, a file that has been downloaded to the personal computer 30 over the Internet from a store computer 12, as explained above in reference to FIG. 1. Also, this process may be used to transfer a file from the portable unit 10 to the personal computer 30 when the file includes product location information downloaded from a store computer, which is not presently needed in the portable unit 10, but which may be of future use. After the file is transferred in step 126, the portable unit 10 returns to await either another signal indicating a file is to be transferred or a control signal indicating that one of the control buttons 74 has been depressed.

Such a control signal, which may be handled in the conventional manner of a keyboard interrupt, is recognized in step 128. In the example of FIG. 6, a RECEIVE button is depressed to start the process of receiving a file from a store computer by means of an IR signal or a radio signal, as described above in reference to FIG. 1. Thus, if the RECEIVE button has been depressed, as determined in step 130, the portable unit 10 transmits a signal in step 132 requesting such a transmission of information. If the store computer 12 responds by transmitting a signal, as determined in step 134, the file transmitted from the store computer is downloaded in step 136 to become the active file, which becomes the barcode location data structure 98 subsequently used both to determine the location of the user within the store, and to determine the locations of various products being sought. When this process of downloading has been completed, an output message indicating success is generated using the speech synthesis routine 94 and transmitted to the user in step 138. On the other hand, if a signal from the store computer 12 is not received, as determined in step 134, and if a predetermined time period to wait for such a signal has expired, as determined in step 140, a error message indicating this failure is generated using the speech synthesis routine 94 and transmitted to the user in step 142. In either case, unit 10 returns to step 124 to wait for a port signal or a control signal after step 138 or step 142.

The preceding discussion assumes that the store computer 12 responds to a query signal from the portable unit 10. Alternately, the store computer 12 may continuously broadcast the data, with the portable unit 10 beginning to store information at a starting point and completing the downloading process when the same point in the transmission is reached again. The starting point can be identified during the transmission at the beginning of the file, or the starting point may be stored within the portable unit 10 for later identification.

A SPEECH button may be depressed to begin a process of controlling the portable unit 10 through the use of spoken commands, which are interpreted by the speech recognition routine 96 after the depression of this button is recognized in step 144. The requirement to depress the SPEECH button before giving a spoken command increases the reliability of using the portable unit 10 in a noisy environment, where many sounds could otherwise be interpreted as attempts to give spoken commands. Alternately, a conventional voice-activated circuit may be used, with a keyword like "computer" being used at the beginning of a command.

The first of these spoken commands, a STORE command, is followed by a spoken name identifying a store, which may be spoken in a sentence such as, "The STORE is XYZ Groceries on Main Street." The STORE command is given to indicate the establishment for which a stored file of information is made active to be the barcode location data structure 98 subsequently used to determine the location of the user within the store and to determine the location of products sought. Thus, when the STORE command is given, as determined in step 146, the file corresponding to the store identified as the object in the command is made active in step 148, following a determination in step 150 that this file is available, being stored in the storage 88 of the portable unit 10. Files corresponding to a number of different stores may be stored in this way. On the other hand, if this file is determined not to be available in step 150, an error message is generated in step 152 within the speech synthesis routine 94 to be transmitted to the user. After step 148 or step 152, the unit 10 returns to step 124 to wait for a port signal or a control signal.

Alternately, the portable unit 10 may present the user with a list of favorite stores, using audio data generated within the speech synthesis routine 94, with the user indicating a selection of the store by pressing a button or by given a spoken command.

The second of these spoken commands, an ADD command, is followed by a spoken name identifying a product that should be added to the target data structure 100 as a product to be found within the store. This command may be spoken in a sentence such as, "ADD ketchup," with the ADD command being followed by a description of the desired product. When a product is added to the target data structure 100, a path to find it is not immediately determined, but rather the user is subsequently notified when he scans a barcode label on an aisle on which the product is found. Thus, after an ADD command is given, as determined in step 154, a determination is made in step 156 of whether the product is listed in the active barcode location data structure 98. This is done by examining the description files in field 98e of the data structure 98. If the description associated with the ADD command is found, the desired product can be located using available information, so the value from field 98a corresponding to the matching description from field 98e is added to the field 100a of the target data structure 100, as the location coordinates for the desired product, as found in fields 98b and 98c are added to the fields 100b and 100c, in step 158. On the other hand, if the description of the desired product is not listed in the active barcode location data structure 98, it cannot be found using the available information, so the user is notified of this problem with an error message generated using the speech synthesis routine 94 in step 160. After step 158 or step 160, the unit 10 returns to step 124 to wait for a port signal or a control signal.

It is understood that the description derived from a spoken command will often be generic, describing a number of entries in the barcode location data structure 98. In the example given above, a store would probably have several different brands of ketchup and several different sizes. Thus, the description derived from the spoken input is only partially descriptive of each corresponding description in field 98e. In such a case, only one of the values from field 98a is added to the target data structure 100. For example, the value from field 98a corresponding to the first instance of the description derived from the spoken input being included within the descriptive material in the field 98e may be added to the target data structure 100.

The third of these commands, a FIND command, is followed by a spoken name identifying a product to be found immediately. This command may be spoken in a sentence such as, "FIND ketchup." After this command is given, as determined in step 162, a determination is made in step 164 of whether the product is listed in the active barcode location data structure 98. If it is, in step 165, the location of the product, taken from the barcode location data structure 98 is loaded into the user location data structure 102. Then, in step 166, this location is compared to the location of the user, also stored in the user location data structure 102, with an optimum path for the user to take to reach the product from his location being determined by the pathfinding routine 97. Then, in step 168, a flag is set in the flag register 103 to indicate that a search for a particular product is occurring, and, in step 170, the user is told by means of an output message generated, using the speech synthesis routine 94, to tell the user of the chosen path. The path is described, for example, in terms of aisles to be used, turns to be made, and of a distance the user must go down an aisle to find the product. On the other hand, if it is determined in step 162 that the requested product cannot be found in the barcode location data structure 98, the user is informed to this problem by an error message generated through the speech synthesis routine 94 in step 172. In either case, after step 170 or step 174, the unit 10 returns to step 124 to wait for a port signal or a control signal.

In the example of FIG. 6, there are only three valid spoken commands, the STORE command, the ADD command, and the FIND command. Thus, if the SPEECH button has been depressed, as determined in step 144, without a valid command being detected in steps 146, 154, and 162, an error is known to have occurred, and the user is informed of this condition in step 176 by an error message generated using the speech synthesis routine 94. Then, the unit 10 returns to step 124 to wait for a port signal or a control signal.

Also in the example of FIG. 6, there are only three buttons that can be pushed to begin command sequences when the portable unit 10 is waiting for a signal in steps 124 and 128. Therefore, when a control signal recognized in step 128 is not determined to be caused by depression of the RECEIVE button in step 130, and if the control signal is further not determined to be caused by depression of the SPEECH button in step 144, the control signal is understood to have been caused by depression of the READ button to initiate reading a barcode label. Therefore, after it has been determined in step 144 that the SPEECH button has not been depressed, the stylus 60 (shown in FIG. 3) is turned on to read a barcode label in step 180 through the barcode reading routine 92, generating a coded value represented by the markings of the barcode. Next, in step 182, the location of the barcode label within the store is determined.

Preferably, each barcode label has associated with it a location that can be determined within the portable unit 10. For example, among the labels 40 at the end of the aisle, the aisle identifying barcode labels uniquely identify their location when their information is decoded, as do the shelf labels. On the other hand, the UPC product labels 36, having been applied to the product packaging by a manufacturer before shipment to the store, cannot in themselves indicate the location of the product within the store. Therefore, in accordance with the invention, the barcode location data structure 98 preferably includes information relating a product identified by a particular barcode with its location within the store, with such information having been transferred from the store computer 12 (shown in FIG. 1). Preferably, the location of any barcode label is found by locating the value represented by the label in field 98a of data structure 98, and by determining the location of the label to be indicated by the corresponding coordinates in fields 98b and 98c. Among the labels 40 at the end of the aisle, the product listing labels may have information describing the location of the individual products they describe, or such information may also be found by searching for the products within the barcode location data structure 98.

After the location of the barcode data that has just been read is determined in step 182, this location is compared in step 184 with data stored in field 102a of the user location data structure 102, which has been set at the location of the previously read bar code label. If the location of the most-recently read barcode label is determined to be different from that of the previously read barcode label, the field 102a of the user location data structure 102 is set in step 186 to store the location corresponding to the most recently read barcode label. A new location is not found, as determined in step 184, if the label which has just been read cannot be related to a location, or if the label is at the same location as the previously read label, such as all of the barcode labels 40 at the end of an aisle (as shown in FIG. 2).

Following step 186, a determination is made in step 188 of whether the flag has been set in the flag register 103. If the flag has been set, it is known that a search is being performed for a particular product, the location of which is stored in the user location data structure 102, so a determination is made in step 190 of whether the user is at the location of the desired product, i.e. if the location of the last label read and the desired product location, both of which are now stored in the user location data structure 102 are the same. If these locations are both the same, an output message is generated in step 192 through the speech synthesis routine 94, telling the user that this location has been reached. If it is determined in step 190 that the location in field 102a of the product being sought has not been reached, a new path, from the location of the most recently read barcode label, now stored in field 102a of the user location data structure 102, to the location of the product, stored in field 102b, is determined by the pathfinding routine 97 in step 194. Then, in step 196, an output message generated by means of the speech synthesis routine 96 to give the user instructions for following the new path.

On the other hand, if a determination is made in step 188 that the flag has not been set, a determination is then made in step 198 of whether the location of the most recently read barcode corresponds to the location of a chosen product, for which data is stored in the target data structure 100. If it does, an output message generated by the speech synthesis routine 96 tells the user which product or products from the target data structure 100 are at the latest determined location.

Further process steps taken by the portable unit 10 are dependent on the type of barcode that has just been read. If it is determined in step 202 that a shelf barcode 38 (shown in FIG. 2) has just been read, an output message generated in step 204 by the speech synthesis routine 94 tells the user the location of the barcode. Then the system returns to step 124 to await another port signal or another control signal.

If it is determined in step 206 that a UPC product barcode has been read, an output description of the product having the barcode is generated by the speech synthesis routine 94 in step 208 provides the user with a description of the chosen product based on information given derived from reading the barcode, and on information stored within field 98e of the barcode location data structure 98. Next, in step 210, a determination is again made of whether the flag has been set to indicate a search for a particular product. If the flag has been set, a further determination is made in step 212 of whether the UPC product barcode represents the particular product for which the search is being made. This determination may be different from the determination previously made in step 190, since it is possible for several different types of products to be stored at the same location. If it is determined in step 212 that the barcode represents the product being sought, the user is informed of this fact in step 214 by an output message generated by the speech synthesis routine 94 in step 214, and the flag in flag register 103 is reset in step 215.

On the other hand, if it is determined in step 210 that a flag is not present, or if it is determined in step 212 that, even through a flag is present, the UPC barcode label does not represent the product which is the object of the search, a determination is made in step 216 of whether this label represents a product that is listed among the previously-chosen products in the target data structure 100. If the product is so listed, the user is informed of that fact in step 217 by a message generated by the speech synthesis routine 94 in step 217, and the corresponding entry is deleted from the target data structure 100 in step 218. If it is determined in step 220 that the barcode label which has just been read is an aisle identification label, field 100*b* of the target data structure 100 is checked in step 222 to determine if any items on the target list of the target data structure 100 are located in the aisle identified by the barcode. If such items are found, an output message is generated by the speech synthesis routine 94 in step 224 to tell the user of this fact and to ask the user if he wants to hear the list of previously chosen products available on the aisle he has just reached. The user responds to the question either with a spoken answer, such as "yes" or "no," which is interpreted through the speech recognition routine 96, or by pressing a button associated with an affirmative or negative response. If an affirmative response is given in step 226, the list of items associated with the aisle is given one at a time, with the name of the item being provided through the speech synthesis routine 94 in step 228. Again, the user responds to the question in step 230 either with a spoken answer or by depressing a button.

This list of items is generated for each target item having a coordinate in field 100*b* of the target data structure 100 matching the aisle coordinate of the most-recently read barcode label. The coded value from field 100*a* of the target data structure 100 is found among the coded values stored in field 98*a* of the barcode location data structure 98, and the corresponding description found in field 98*e* of the data structure 98 is used to generate an item name through the speech synthesis routine 94.

If the user responds affirmatively in step 230, the system goes to step 165, in which the location of the product, taken from the barcode location data structure 98 is loaded into the user location data structure 102. Then, in step 166, this location is compared to the location of the user, also stored in the user location data structure 102, with an optimum path for the user to take to reach the product from his location being determined by the pathfinding routine 97. Then, in step 168, a flag is set in the flag register 103 to indicate that a search for a particular product is occurring, and, in step 170, the user is told by means of an output message generated, using the speech synthesis routine 94, to tell the user of the chosen path. In this example, since the product has been found to be on the aisle for which the aisle ID label has just been read, the path to find the product should only consist of a distance to be walked along the aisle.

If the user responds negatively in step 230, a determination is made in step 232 of whether the product is the last item in the target data structure 100 associated with the particular aisle identified by the label most recently read. If it is not the last item, the system returns to step 228 to describe the next item in the target data structure that can be found on that aisle. In this way, the system proceeds through the list of such items until the user selects an item to be immediately found or until all such items have been presented.

If no item associated with the aisle identified by the most recently read barcode label is in the target list of the target data structure 100, the system proceeds to step 234, in which a determination is made of whether there are any items in the barcode location data structure 98 which are listed as being on that aisle. If the user responds negatively in step 226, or if the last item previously chosen as a target has been presented, as determined in step 232, the system also proceeds to step 234. It is possible that the aisle actually contains no products for sale, or that the list in the barcode location data structure 98 is incomplete. If no such items can be found, the portable device 10 returns to from step 234 to step 124 to wait again for a port signal or a control signal.

If items from the aisle are found in step 234 to be listed in the barcode location data structure 98, the system proceeds to step 236, in which the user is asked whether he wants to hear the list of such items. If he responds negatively in step 238, the system returns to step 124 to wait for the port signal or control signal. If he responds affirmatively in step 238, he is presented with a list of individual items, described by synthesized speech in step 240, each of which may be chosen in step 242 to be found immediately or, in step 244, to be added to the target list of target data structure 100. These choices may be indicated by the user through a spoken command beginning with "find" or "add" or by pressing either a button corresponding to the finding process or to the process of adding a product to the target list. When a choice to add is indicated, the product described in step 240 is added to the target list in step 246. When the last item in the barcode location data structure 100 available on the aisle has been considered, as determined in step 248, the system returns to step 124 to wait for a port signal or a control signal.

Items within the barcode location data structure 98 are found by finding an aisle identifying coordinate in field 98*b* which is equal to the aisle coordinate of the most recently read barcode label. A description of each such item is then found in the corresponding descriptions stored in field 98*e*, with this description being used to generate synthesized speech. If the same description is repeated within the data structure 98 because different versions of an item are available, the description is preferably used only once to generate synthesized speech.

If the most recently read barcode label is determined in step 250 to be an end of aisle label listing a product available on the aisle, an output message generated within the speech synthesis routine 94 is provided in step 252. The user can then indicate, in step 254, a desire to find the item immediately, or he may indicate, in step 256, a desire to add the product to the target list. An affirmative response in step 254 causes the system to proceed to step 165 to begin the process of establishing a path to find the product. An affirmative response in step 256 causes the product to be added to the target list in step 258. After the product has been added to the target list, or after a decision has been indicated not to do so, the system returns to step 124 to wait for a port signal or a control signal.

If the most recently read barcode label is determined in steps 202, 206, 220, and 250 not to be one of the types of labels associated with the operation of the portable system 10 in accordance with the invention, an error message, generated through the speech synthesis routine in step 260 informs the user that the label has been misread or that the label is apparently improper. Then the system returns to step 124 to wait for a port signal or a control signal.

While the invention has been described in its preferred forms or embodiments with some degree of particularity, it is understood that this description has been given only by way of example and that numerous changes in the details of construction and use, including changes in the combination and arrangement of parts and process steps, may be made without departing from the spirit and scope of the invention.

What is claimed is:

1. A system for providing information within a site, wherein said system comprises:
    a plurality of barcode labels placed at a plurality of locations within said site, wherein each barcode label within said plurality of barcode labels includes a pattern of parallel markings representing a coded value, and
    a portable device including:
        a barcode reader producing electrical signals in response to patterns of said parallel markings;
        an audio amplifier;
        an audio speaker driven by said audio amplifier;
        data storage including a barcode location data structure having a first field containing data representing a plurality of coded values, a second field containing data representing a plurality of values of a first location coordinate, a third field containing data representing a plurality of values of a second location coordinate, wherein each coded value in said plurality of coded values is represented by a pattern of parallel markings on a barcode label within said plurality of barcode labels, wherein each first location coordinate within said second field and each corresponding second location coordinate within said third field form a set of location coordinates representing a location of a label having a corresponding coded value in said first field; and
        a processor programmed to generate a most recently read coded value represented by a pattern of parallel markings read by said barcode reader in response to said electrical signals produced by said barcode reader, to find a set of location coordinates within said second and third fields of said first data structure corresponding to said coded value, to generate a pattern of synthetic speech describing a location represented by said set of location coordinates, and to cause said audio amplifier to drive said speaker in response to a generated pattern of synthetic speech.

2. The system of claim 1, wherein
    said system additionally comprises a plurality of items placed at a plurality of locations within said site,
    said barcode location data structure additionally has a fourth field containing a plurality of descriptions representing said items, wherein each description in said plurality of descriptions is associated with a set of location coordinates in said second and third fields, and wherein said set of location coordinates describes a location of an item described by said description, and
    said processor is additionally programmed to accept an input describing an item in said plurality of items, and to determine a location of said item by finding a set of location coordinates associated with a description of said item in said first data structure.

3. The system of claim 2, wherein said processor is additionally programmed to determine a path between a location represented by said set of location coordinates corresponding to said coded value in said data structure and said location of said item, and to generate a pattern of synthetic speech describing said path.

4. The system of claim 2, wherein said processor is additionally programmed to form a list of descriptions of items at a location represented by said set of location coordinates corresponding to said coded value in said data structure, and to generate a pattern of synthetic speech describing said list of descriptions of said items.

5. The system of claim 2, wherein
    said portable device additionally includes a microphone, and
    said input describing an item in said plurality of items is spoken into said microphone.

6. The system of claim 1, wherein
    said system additionally comprises a plurality of items placed at a plurality of locations within said site,
    said first data structure additionally has a fourth field containing a plurality of descriptions representing said items, wherein each description in said plurality of descriptions is associated with a set of location coordinates in said second field, and wherein said set of location coordinates describes a location of an item described by said description, and
    said processor is additionally programmed to generate a first list of descriptions of items from said fourth field having sets of location coordinates equal to said location coordinates corresponding to said coded value, and to generate a pattern of synthetic speech describing said first list of descriptions.

7. The system of claim 1, wherein
    said system additionally comprises a plurality of items placed at a plurality of locations within said site,
    each item within said plurality of items includes a barcode label representing a coded value,
    said barcode location data structure additionally has a fourth field containing a plurality of descriptions representing said items, wherein each description in said plurality of descriptions is associated with a set of location coordinates in said second and third fields, and wherein said set of location coordinates describes a location of an item described by said description,
    said data storage additionally includes a target data structure containing a plurality of coded values, and
    said processor is additionally programmed to accept an input describing an item in said plurality of items, to determine a target description corresponding to said input, to find said target description within said plurality of descriptions in said fourth field of said location data structure, and to add a coded value, from said first field of said location data structure corresponding to a description within said plurality of descriptions including said target description, to said target data structure.

8. The system of claim 7, wherein
    said plurality of barcode labels include a number of aisle identifying barcode labels placed to identify aisles within said site,
    each said first coordinate represents an aisle within said site,
    said barcode location data structure additionally includes a fifth field containing data representing a type of barcode label corresponding to each value represented in said first field of said barcode location data structure, said processor is additionally programmed to determine that said most recently read coded value is from an aisle identifying barcode label by finding said most recently read coded value among data contained in said first field corresponding to data in said fifth field representing an aisle identifying label, then to determine whether said target data field contains data representing a coded value found within said first field of said barcode location data structure corresponding to a location coordinate in second field representing an aisle identified by said aisle identifying bar code label, and then to generate a pattern of synthetic speech describing each item in said plurality of items represented by data in said target data structure.

9. The system of claim 7, wherein said processor is additionally programmed to determine that said most recently read coded value is from a UPC barcode printed on a surface of an item within said plurality of items by finding said most recently read coded value among data contained in said first field corresponding to data in said fifth field representing UPC barcode labels, then to determine that a coded value represented by data in said target data field is equivalent to said most read coded value, and then to delete said coded value represented by data in said target data field from said target data field.

10. The system of claim 1, wherein:
said system additionally comprises a site computer accessing a database containing data representing said coded values and said location coordinates of said barcode labels, and a data transmission link connecting said site computer with said portable device;
said site computer transfers said data over said data transmission link; and
said processor is additionally programmed to receive data from said data transmission link and to store said data within said barcode location data structure.

11. The system of claim 10, wherein said data link includes a transmitter transmitting a radio frequency signal modulated with data from said site computer and a receiver receiving said radio frequency signal at said portable unit.

12. The system of claim 10, wherein said data link includes a transmitter transmitting an infrared beam modulated with data from said site computer and a receiver receiving said infrared beam at said portable unit.

13. The system of claim 10, wherein said data link includes:
a switched telephone network;
a connection between said site computer and said switched telephone network;
a personal computer downloading data from said site computer from said switched telephone network;
a channel transmitting said data from said personal computer to said portable device.

14. A method performed within a portable device for providing information for providing information within a site based on a plurality of barcode labels within said site, wherein said method comprises:
downloading information describing coded values of barcode labels within said site and locations of said barcode labels within said site;
storing said information in a barcode location data structure;
reading a barcode label;
generating a most recently read coded value from said barcode label;

determining a location of said barcode label from said information stored within said barcode location data structure;
generating a pattern of synthetic speech describing said location of said barcode label; and
driving an audio speaker in response to said pattern of synthetic speech describing said location of said barcode label.

15. The method of claim 14, wherein said information downloaded and stored in said barcode location data structure additionally includes data indicating types of said barcode labels and information describing items on which certain of said barcode labels are place, and wherein said method additionally comprises:
storing said location of said barcode label in a user location data structure;
receiving a user input choosing an item;
determining a location of said item from data stored within said barcode location data structure;
storing said location of said item in said user location data structure;
determining a path within said site between said location of said barcode label and said location of said item;
generating a pattern of synthetic speech describing said path; and
driving an audio speaker in response to said pattern of synthetic speech describing said path.

16. The method of claim 14, wherein said information downloaded and stored in said barcode location data structure additionally includes data indicating types of said barcode labels and information describing items on which certain of said barcode labels are place, and wherein said method additionally comprises:
determining that said barcode label identifies an end of an aisle within said site;
determining each item located on said aisle from information stored in said barcode location data structure;
generating a pattern of synthetic speech describing each item determined to be located on said aisle; and
driving an audio speaker in response to said pattern of synthetic speech describing each item determined to be located on said aisle.

17. The method of claim 16, additionally comprising:
accepting a user input selecting an item after driving said audio speaker in response to said pattern of synthetic speech describing each item determined to be located on said aisle; and
storing information describing each item selected in a target data structure.

18. The method of claim 17, additionally comprising, after determining that said barcode label identifies an end of an aisle within said site:
determining each item described by information stored within said target data structure and located on said aisle;
generating a pattern of synthetic speech describing each item described by information stored within said target data structure and located on said aisle; and
driving an audio speaker in response to said pattern of synthetic speech describing each item determined to be described by information within said target data structure and located on said aisle.

19. A method performed within a portable device for providing information within a site based on a plurality of barcode labels within said site, wherein said method comprises:

storing, within a barcode location data structure, a plurality of coded values in a first field, a plurality of first coordinate values in a second field, and a plurality of second coordinate values in a third field, wherein each coded value in said plurality of coded values is represented by a pattern of parallel markings on a barcode label in said plurality of barcode labels, and wherein each first location coordinate within said second field and each corresponding second location coordinate within said third field form a set of location coordinates representing a location of a label having a corresponding coded value in said first field;

reading a barcode label within said plurality of barcode labels;

generating a most recently read coded value from said barcode label most recently read;

finding a stored coded value matching said most recently read coded value from a plurality of coded values stored within said first field of said barcode location data structure;

finding a first location coordinate matching said most recently read coded value within data stored in a second field of said barcode location data structure at a location corresponding to said stored coded value matching said most recently read coded value;

finding a second location coordinate matching said most recently read coded value within data stored in a third field of said barcode location data structure corresponding to said stored coded value matching said most recently read coded value;

generating a pattern of synthetic speech describing a location represented by said first and second location coordinates matching said most recently read coded value; and driving an audio speaker in response to said pattern of synthetic speech.

20. The method of claim 19, additionally comprising storing said first and second location coordinates matching said most recently read coded value in a first field within a user location data structure.

21. The method of claim 20, additionally comprising:

storing, within a fourth field of said barcode location data structure, a plurality of descriptions of items, wherein each description within said fourth field is descriptive of an item found at location within said site described by coordinates in said second and third fields corresponding to said description within said fourth field;

receiving an input describing an item;

finding a target description corresponding to said input describing an item within data stored in a fourth field of said barcode location data structure;

finding a third location coordinate within data stored in said second field of said barcode location data structure corresponding to said target description;

finding a fourth location coordinate within data stored in said third field of said barcode location data structure corresponding to said target description;

storing said third and fourth location coordinates in a second field of said user location data structure;

setting a flag bit in storage within said portable device;

determining a path within said site between a location described by first and second location coordinates and a location described by said third and fourth location coordinates;

generating a pattern of synthetic speech describing said path; and driving an audio speaker in response to said pattern of synthetic speech describing said path.

22. The method of claim 21, wherein receiving an input describing an item includes recognizing an input spoken into a microphone of said portable device.

23. The method of claim 21, additionally comprising:

determining that said flag bit is set;

comparing said first and second coordinates found within data stored in said second and third fields of said barcode location data structure corresponding to said most recently read coded value, after reading said barcode label, with location coordinates previously stored in said first field and second fields within said user location data structure;

if said first and second coordinates found within data stored in said second and third fields of said barcode location data structure corresponding to said most recently read coded value are identical to said location coordinates previously stored in said second field within said user location data, generating a pattern of synthetic speech indicating that the location of said item has been reached; and if said first and second coordinates found within data stored in said second and third fields of said barcode location data structure corresponding to said most recently read coded value are different from said location coordinates previously stored in said first and second fields of said user location data structure, determining a new path within said site between a location described by first and second location coordinates corresponding to said most recently read coded value and a location described by said third and fourth location coordinates; generating a new pattern of synthetic speech describing said new path; and driving an audio speaker in response to said new pattern of synthetic speech describing said new path, and storing said first and second coordinates found within data stored in said second and third fields of said barcode location data structure corresponding to said most recently read coded value in said first field of said user location data structure.

24. The method of claim 20, additionally comprising:

storing, within a fourth field of said barcode location data structure, a plurality of descriptions of items, wherein each description within said fourth field is descriptive of an item found at location within said site described by coordinates in said second and third fields corresponding to said description within said fourth field;

receiving an input describing an item;

finding a target description corresponding to said input describing an item within data stored in a fourth field of said barcode location data structure;

finding a coded value within data stored in said first field of said barcode location data structure corresponding to said target description;

finding a third location coordinate within data stored in said second field of said barcode location data structure corresponding to said target description;

finding a fourth location coordinate within data stored in said third field of said barcode location data structure corresponding to said target description;

storing said coded value in said first field of a target data structure;

storing said third location coordinate in a second field of said target data structure; and storing said fourth location coordinate in a third field of said target data structure.

25. The method of claim 24, wherein receiving an input describing an item includes recognizing an input spoken into a microphone of said portable device.

26. The method of claim 21, additionally comprising:

storing, within a fifth field of said barcode location data structure, a plurality of barcode type identifiers, wherein each barcode type of identifier within said fifth field is descriptive of a type of barcode label corresponding to a value represented in said first field of said barcode location data structure, wherein each coordinate value stored in said second field of said barcode location data structure identifies an aisle in which a barcode label corresponding to a value represented in said first field of said barcode location data structure is found, and wherein an end of aisle identifier stored within said fifth field describes a barcode label placed at an end of an aisle, determining that said most recently read coded value is from a barcode label placed at an end of an aisle by finding an end of aisle identifier in said fifth field corresponding to said most recently read coded value in said first field of said barcode location data structure;

finding each target coded value within said first field of said target data structure corresponding to a coordinate value within said second field of said target data structure identifying said aisle in which said most recently read barcode label is placed, as determined by a coordinate value within said second field of said barcode location data structure;

for each said target coded value, finding an equivalent coded value in said first field of said barcode location data structure;

for each said equivalent coded value, finding a corresponding target description in said fourth field of said barcode location data structure;

generating a pattern of synthetic speech describing each said target description; and driving an audio speaker in response to said pattern of synthetic speech.

27. The method of claim 26, additionally comprising, after determining that said most recently read coded value is from a barcode label placed at an end of an aisle by finding an end of aisle identifier in said fifth field corresponding to said most recently read coded value in said first field of said barcode location data structure:

finding a listed coded value within said first field of said barcode location data structure corresponding to a coordinate value within said second field of said barcode location data structure corresponding to a coordinate value within said second field of said barcode location data structure identifying said aisle in which said most recently read barcode label is placed;

for each said listed coded value, finding a corresponding listed description in said fourth field of said barcode location data structure;

generating a pattern of synthetic speech describing each said listed description; and driving said audio speaker in response to said pattern of synthetic speech describing each said listed description.

28. The method of claim 26, additionally comprising, after driving said audio speaker in response to said pattern of synthetic speech describing a listed description:

accepting a user input selecting said listed description; and adding a coded value and location coordinates corresponding to said listed description in said barcode data structure to said target data structure.

29. The method of claim 27, additionally comprising:

determining that said most recently read coded value is from a UPC barcode label on an item;

determining that data representing said item is listed in said target data structure; and erasing said data representing said item from said target data structure.

* * * * *